United States Patent
Amari (10) Patent No.: US 11,007,731 B2
(45) Date of Patent: May 18, 2021

(54) CUTTER MODULE FOR A PLACEMENT HEAD FOR PLACING AN IMPREGNATED FIBER TAPE, A PLACEMENT HEAD, AND A DEVICE FOR PLACING SUCH A FIBER TAPE

(71) Applicant: AIRBUS HELICOPTERS, Marignane (FR)

(72) Inventor: Andre Amari, La Chapelle en Serval (FR)

(73) Assignee: AIRBUS HELICOPTERS, Marignane (FR)

( * ) Notice: Subject to any disclaimer, the term of this patent is extended or adjusted under 35 U.S.C. 154(b) by 253 days.

(21) Appl. No.: 15/985,746

(22) Filed: May 22, 2018

(65) Prior Publication Data

US 2018/0339472 A1    Nov. 29, 2018

(30) Foreign Application Priority Data

May 23, 2017  (FR) ....................................... 1770522

(51) Int. Cl.
  *B29C 70/54* (2006.01)
  *B29C 70/38* (2006.01)
  (Continued)

(52) U.S. Cl.
  CPC .......... *B29C 70/545* (2013.01); *B29C 70/388* (2013.01); *B26D 1/085* (2013.01); *B26D 7/025* (2013.01); *B29C 2793/0027* (2013.01)

(58) Field of Classification Search
  CPC ............................ B29C 70/545; B29C 70/388
  (Continued)

(56) References Cited

U.S. PATENT DOCUMENTS 2,353,232 A * 7/1944 Greene ..................... B26D 7/34
                                                493/364
4,356,054 A * 10/1982 Gotz .................... B21D 43/287
                                                100/325
(Continued)

FOREIGN PATENT DOCUMENTS

EP    0846551 A1 *  6/1998 ........... B29C 70/545
EP    0846551 A1     6/1998
(Continued)

OTHER PUBLICATIONS

Machine Translation EP-0846551-A1 (Year: 1998).*
French Search Report for FR 1770522, Completed by the French Patent Office, dated Feb. 8, 2018, All together 6 Pages.

*Primary Examiner* — Daniel McNally
(74) *Attorney, Agent, or Firm* — Brooks Kushman P.C.

(57) ABSTRACT

A cutter module, the cutter module comprising a blade and a sacrificial face. The blade and the sacrificial face face each other along a cutting axis, the blade and the sacrificial face being arranged on either side of a plane of passage for a tape for cutting, and at a distance therefrom, the cutter assembly and the sacrificial face being movable in translation along the cutting axis and respectively in two opposite cutting directions in order to enter into contact in the plane of passage during a stage of cutting, the cutter assembly and the sacrificial face being movable in translation along the cutting axis and respectively in two opposite return directions in order to move away from the plane of passage after the cutting operation.

20 Claims, 3 Drawing Sheets

(51) Int. Cl.
 *B26D 1/08* (2006.01)
 *B26D 7/02* (2006.01)

(58) Field of Classification Search
 USPC .......................................................... 156/60
 See application file for complete search history.

(56) References Cited

U.S. PATENT DOCUMENTS

| | | |
|---|---|---|
| 6,540,000 B1 | 4/2003 | Darrieux et al. |
| 9,010,224 B2 | 4/2015 | Imamaki et al. |
| 2007/0039434 A1* | 2/2007 | DeVlieg ............... B29C 70/382 83/13 |
| 2010/0139467 A1 | 6/2010 | Gutknecht et al. |
| 2011/0232447 A1 | 9/2011 | Jaynes |

FOREIGN PATENT DOCUMENTS

| | | |
|---|---|---|
| EP | 1922209 A1 | 5/2008 |
| WO | 2007021570 A1 | 2/2007 |

\* cited by examiner

CUTTER MODULE FOR A PLACEMENT HEAD FOR PLACING AN IMPREGNATED FIBER TAPE, A PLACEMENT HEAD, AND A DEVICE FOR PLACING SUCH A FIBER TAPE

CROSS-REFERENCE TO RELATED APPLICATIONS

This application claims priority to French patent application No. FR 1770522 filed on May 23, 2017, the disclosure of which is incorporated in its entirety by reference herein.

BACKGROUND OF THE INVENTION

(1) Field of the Invention

The present invention relates to a cutter module for a placement head for placing an impregnated fiber tape, to such a placement head, and to a placement device for placing such an impregnated fiber tape. The invention thus lies in the technical field of fabricating parts out of composite materials with an impregnated fiber tape placed by the fiber placement method.

2) Description of Related Art

The fiber placement method is a method that is an alternative to winding a continuous filament.

Fiber placement is a method of depositing fibers on surfaces of a variety of shapes. For example, use is made of a tape made of glass, carbon, or other fibers that are impregnated with an epoxy or equivalent resin.

Fiber placement is performed by using a device provided with a movable placement head. The placement head has a reel around which there is wound a tape that is several tens of meters long, specifically thirty meters, for example.

The placement head thus serves to position segments of the tape in question on a support by direct mechanical contact on the support. For this purpose, the placement head is driven by a movement system of the positioning gantry or robot type, having its degrees of freedom to move servo-controlled as a function of the geometry of the support that is to be covered.

In particular, the placement head serves to perform tape deposition sequences in automatic manner. Each sequence includes operations of starting, depositing, and cutting.

During the starting stage, the fiber tape is taken to the support that is to be covered. During the deposition stage, a segment of the fiber tape is deposited on the support by direct mechanical contact.

During the stage of cutting, the fiber tape is cut so that the deposited segment presents the required length.

Under such circumstances, the placement head usually includes a cutter module for cutting the tape. Arranging a cutter module within a placement head can be difficult.

Furthermore, certain cutter modules tend to deform the shape of the tape and/or to modify the path followed by the tape while cutting is taking place.

Document U.S. Pat. No. 6,540,000 describes a placement head. That placement head is provided with a deposition roller that is movable in elevation relative to a plate. The placement head includes a cutter module. The cutter module is provided with a vibrating anvil that is mounted in a fixed position, together with a retractable cutter member. The cutter member has an arm that is movable in rotation relative to an axis of rotation of the deposition roller, the arm carrying a blade.

In order to operate, that device requires a large amount of volume for allowing the blade to move in rotation.

Document US 2010/0139467 is remote from the field of the invention and the above-mentioned problems, since it relates to a conveyor device and not to a placement head. That conveyor device comprises a feed conveyor followed by a discharge conveyor. A cutter module has a top member that is movable in rotation and that is provided with a round knife, and a blade that is movable in translation.

According to Document US 2010/0139467, a band is moved on the feed conveyor by a movement system. The movement system has a magnet beam. At one end, the feed conveyor co-operates with spring pretensioning means.

In operation, the band is moved on the feed conveyor and then on the discharge conveyor. The top member pivots downwards in order to press the round knife against the band, compressing the spring so as to move the feed conveyor downwards. The band is then locally deformed so as to have a V-shape. The blade is then moved in translation in order to cut the band, at its V-shape.

The cutter module of Document US 2010/0139467 thus presents the drawback of moving and deforming the band while cutting it.

Document U.S. Pat. No. 9,010,224 is remote from the field of the invention. That Document U.S. Pat. No. 9,010,224 describes a system having rotary blades for cutting a sheet. Such a system would appear to be difficult to make compatible with a fiber placement head.

Likewise, Document US 2011/0232447 is remote from the field of the invention, relating to a cutter system for cutting a blister packaging system. The cutter system has a blade that is movable in translation in order to cut the packaging system while pressing against a contact face.

Document EP 1 922 209 describes a cutter module having a movable blade.

Document U.S. Pat. No. 4,356,054 describes a cutter module having a blade and a blade counter bar.

Document EP 0 846 551 is also known.

In this context, a cutter module may tend to move a band while it is being cut in various directions that may tend to deform the band. Certain cutter modules can also occupy a large amount of space.

BRIEF SUMMARY OF THE INVENTION

An object of the present invention is to thus to provide a cutter module tending to cut a tape in reliable manner, and in particular a tape made of non-cross-linked composite materials.

The invention provides a cutter module suitable for cutting a matrix-impregnated fiber tape, the cutter module comprising a cutter assembly provided with a blade, the cutter assembly being movable in translation along a cutting axis, the cutter module further comprising a sacrificial face.

The blade and the sacrificial face each other along the cutting axis, the blade and the sacrificial face being arranged on either side of a plane of passage, and at a distance therefrom, the plane of passage being for containing and/or being configured to contain the tape during an operation of depositing the tape, said cutter assembly and said sacrificial face being movable in translation together or in alternation along the cutting axis respectively in two opposite or indeed coplanar "cutting" directions, being configured to enter into contact and/or to cut the matrix impregnated fiber tape in the plane of passage during a stage of cutting, said cutter assembly and said sacrificial face being movable together or in alternation in translation along the cutting axis respectively in two opposite or indeed coplanar "return" directions in order to move away from said plane of passage after said cutting.

The term "blade" is used to designate a sharp member, for example having a cutting edge or a wire. For example, the cutter element may include a blade support and a blade, the blade being releasably secured to the blade support by conventional means, e.g. of the screw/nut, spring clip, . . . type. As a result, various different blades may be mounted in the cutter module.

The term "sacrificial face" distances a face of a member that acts as an anvil and that may be made of various materials.

The term "plane of passage" designates a plane in which the tape travels through the cutter module during a starting operation and a deposition operation. The plane of passage can have a thickness equal to the thickness of the rubber.

The expression "to enter into contact and/or to cut the matrix impregnated fiber tape in the plane of passage during a stage of cutting" means that the interface between the blade and the sacrificial face lies in/or against the plane of passage while cutting is taking place.

Under such circumstances, the cutter module is intended in particular for cutting a matrix-impregnated fiber tape.

The cutter module makes it possible to place a blade and a sacrificial face acting as an anvil on opposite sides of the tape that is to be cut. For example, the blade has a cutting edge or a sharp wire parallel to the sacrificial face.

In addition, the cutter assembly, and thus the blade, together with the sacrificial face, are both movable in translation along the cutting axis. For example, after being instructed to make a cut, the blade moves down towards the tape in a downward first cutting direction. In addition, the sacrificial face rises towards the tape in an upward second cutting direction so as to pinch and cut the tape in its plane of passage. Thus, during cutting, the cutter module does not tend to modify the shape of the tape or to modify its position. The cutter module can thus cut a tape of non-cross-linked composite materials in a manner that is reliable.

For example, the blade is pushed against a top face of the tape that is not very tacky, while the sacrificial face is pushed against a bottom face of the tape that is relatively tacky. The blade goes through the tape to cut it and reach the sacrificial face.

After a short given length of time, of the order of a few tenths of a second, the blade and the sacrificial face move away from the tape quite quickly respectively in an upward first return direction and in a downward second return direction so as to tend to avoid the tape adhering to the cutter module as a result of the tackiness of the tape, with the material of the sacrificial face being selected for its non-stick nature. The tape is thus cut and tends to remain in its plane of passage.

The cutter module may include one or more of the following characteristics.

Other than in a said stage of cutting, a distance separates said blade and said sacrificial face along said cutting axis, said plane of passage passing through a space between said blade and said sacrificial face, said distance may be greater than or equal to one centimeter, and for example may lie in the range one centimeter to three centimeters, and may in particular be equal to two centimeters. This distance may result from the stroke of an actuator that moves the cutter assembly and the sacrificial face, which actuator may be of dimensions that are determined as a function of the type of tape to be cut and of the space occupied by the starter system.

The distance between the sacrificial face and the blade, and in particular its cutting edge, may be quite large. Such a large distance can make it easy to pass the tape on its own, possibly together with moving equipment of the placement head.

In an aspect, the cutter module may include a movement system for moving the cutter assembly and the sacrificial face along said cutting directions and along said return directions.

In a first embodiment, the cutter assembly and the sacrificial face respectively form two elements that are moved by the movement system, the movement system may include a rack device, the rack device comprising a pinion meshing with a rack, the rack device having an actuator for causing the pinion and the rack to move, one of the two elements being constrained to move in translation with the pinion, and the other one of said two elements being constrained to move in translation with the rack.

Unless otherwise specified, the term "actuator" is used below to designate an actuator that may be linear or rotary, an electric motor, an electric jack, a hydraulic jack, a pneumatic jack, . . . .

A single actuator can move the sacrificial face and the blade by means of the rack device. The running of the pinion along the rack or the shifting of the rack relative to the pinion thus causes the blade and the sacrificial face to move.

In a second embodiment, the movement system comprises two actuators, one of said two actuators moving only said cutter assembly in translation along the cutting axis, the other one of said two actuators moving only the sacrificial face in translation along the cutting axis.

This second embodiment is relatively simple, but it involves two actuators, which can occupy a larger amount of space.

In a third embodiment, the cutter assembly and the sacrificial face respectively form two elements that are moved by a movement system, the movement system comprising a pulley system and an actuator, one of said elements, referred to as the "active" element, being movable in translation along the cutting axis under the action of said actuator, and the other element being referred to as the "passive" element, the pulley system having first and second return means that are stationary in translation, in particular in the reference frame of the cutter module, and that are arranged laterally on either side of a plane that is orthogonal to the plane of passage and that passes via the active element, the pulley system having at least one movable pulley that is movable in translation along the cutting axis and that is constrained to move with the passive element in translation, in particular in said reference frame, along the cutting axis, the pulley system comprising a belt, said belt passing in succession around the first return means then around each said at least one pulley, then around the second return means in order to return to a portion that is constrained to move in translation with the active element, said passive element being arranged between said belt and said plane of passage so that a movement in translation of the active element gives rise to a movement of said belt, causing the passive element to move in translation.

A single actuator can move both the sacrificial face and the blade by means of the pulley system.

In a fourth embodiment, said cutter assembly and said sacrificial face form two respective elements that are moved by the movement system, said cutter module comprising a stationary support and a movable support that is movable in translation, in particular in said reference frame along the cutting axis relative to the stationary support, said movable support comprising a frame extending along the cutting direction from a bottom to a top plate, said bottom comprising one of said elements, referred to as the "bottom" element, and the other element being referred to as the "top" element, said top element being movable in translation along the cutting axis relative to the movable support and being arranged between said bottom and the top plate, said movement system having a single actuator that presents length that varies between an extended position and a retracted position, said actuator being fastened to the top plate and to the top element so that extension of said actuator from the retracted position towards the extended position causes the blade and the sacrificial face to move in said cutting direction and so that retraction of said actuator from the extended position towards the retracted position causes the blade and the sacrificial face to move along said return directions.

A single actuator can move the sacrificial face and the blade by means of the movable support. Specifically, the actuator moves the movable support and thus the passive element, and also the active element.

This embodiment is found to be relatively simple and compact.

In an aspect, said cutter module may include guide means for guiding movement in translation of the movable support relative to the stationary support.

For example, the guide means may comprise a slot in the movable support receiving a rail or a finger of the stationary support. Alternatively, a rail or a finger of the movable support may be received in a slot of the stationary support.

In an aspect, said cutter module may include a guide system for guiding movement in translation of the top element relative to the movable support.

For example, the guide system may include a slot of the movable support receiving a rail or a finger of the top element. Alternatively, a rail or a finger of the movable support may be received in a slot of the top element.

In an aspect, the stationary support may include a top abutment, said top element being in abutment against said top abutment when said actuator is in said retracted position.

In an aspect, the stationary support includes a bottom abutment, said top element being in abutment against said bottom abutment when said actuator is in said extended position.

Such a bottom abutment constitutes an end-of-stroke abutment for movement in translation of the active element seeking to position the active element accurately in the plane of passage of the tape.

In an aspect, the cutter module may include at least one spring arranged between the top plate and the stationary support.

For example, one or more compression springs are arranged between the stationary support and the movable support so as to provide a force to space apart the stationary support and the movable support.

Independently of the embodiment, the cutter module may include a guide secured to the sacrificial face in order to position said tape transversely during cutting along a transverse axis orthogonal to the cutting axis.

For example, such a guide includes at least one sloping face terminating on the sacrificial face in order to enable the tape to be recentered regardless of the position of the placement head.

The guide serves to channel and calibrate the cut tape regardless of the nature of the material(s) of the tape.

In an aspect, the guide may include at least one slot, said blade sliding in said slot.

Such a slot serves to guide the blade.

Independently of the embodiment, the cutter module may include a nozzle blowing a fluid under the tape, which fluid may present a moderate temperature that is optionally controlled.

By way of example, a nozzle under pressure control may serve to project a fluid against the tape. By way of example, the fluid is air.

Optionally, the nozzle is placed under the tape in order to blow a fluid against the tacky face of the tape so as to limit the ability of the cut end of the tape to stick to the sacrificial face, and/or in order to hold the cut end of the tape in the air during the stages of stopping the placement head.

In addition to a cutter module, the invention provides a placement head for placing a matrix-impregnated fiber tape on a support. The placement head may be of any known type.

In addition, the placement head includes a cutter module of the invention.

Likewise, a placement system may be provided with a placement head of the invention, a movement device for moving the placement head, and control means to control the movement device and the placement head.

The invention also provides a method suitable for being applied by the cutter module of the invention.

The method seeks to cut a matrix-impregnated fiber tape after an operation of depositing said tape on a support. The method comprises the steps of:

moving a blade and a sacrificial face together or in alternation along two opposite cutting directions in order to reach a plane of passage, said tape being arranged in said plane of passage during the deposition operation;

cutting the tape in said plane of passage by means of said blade and said sacrificial face; and moving said blade and said sacrificial face together or in alternation along two opposite return directions to go away from said plane of passage.

In particular, the blade may be pushed towards a top face of the tape that is not very tacky, while the sacrificial face is pushed against a bottom face of the tape that is relatively tacky.

BRIEF DESCRIPTION OF THE DRAWINGS

The invention and its advantages appear in greater detail from the context of the following description of examples given by way of illustration and with reference to the accompanying figures, in which.

Elements present in more than one of the figures are given the same references in each of them.

DETAILED DESCRIPTION OF THE INVENTION

FIGS. 1 to 6 show a cutter module of the invention.

Figure 1:
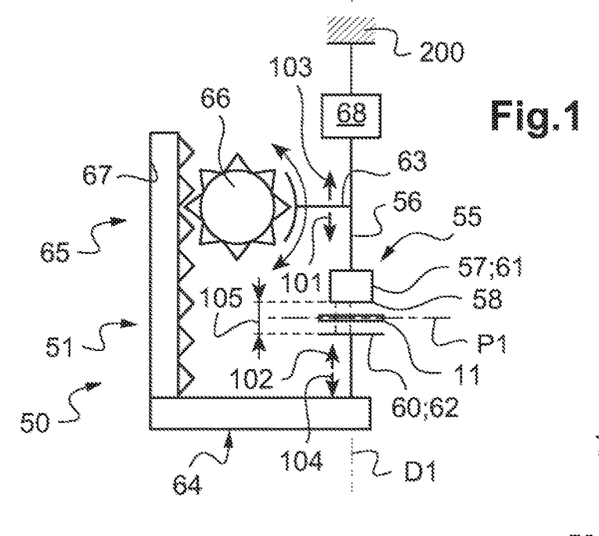
FIGS. 1 to 6 are views of cutter modules of the invention.

With reference to FIG. 1, and independently of the embodiment, the cutter module 50 is used in particular for cutting a tape 11, e.g. within a placement head for putting a fiber tape into place. Within the cutter module, the tape 11 always moves in a plane referred to as the plane of passage P1. The cutter module serves to cut the tape in its plane of passage P1, and thus without deflecting it or deforming it.

Consequently, the cutter module 50 comprises a cutter assembly 55. The cutter assembly 55 has a blade 57 and optionally a blade support 56 carrying the blade 57. The blade 57 may have a sharp edge, e.g. in the form of a wire or a cutting edge.

In addition, the cutter module 50 includes a spacer with a "sacrificial" face 60.

The blade 57 and the sacrificial face 60 may for example face each other along a cutting axis D1 that is optionally orthogonal relative to the plane of passage P1. The term "facing each other" means that the blade 57 and the sacrificial face 60 are positioned facing each other along the cutting axis D1 in the absence of any object arranged between the blade 57 and the sacrificial face. A plane passing via the cutting axis, and optionally orthogonal to the plane of passage, thus passes via the blade 57 and the sacrificial face 60.

For example, the sharp edge 58 of the blade 57 is parallel to the sacrificial face 60, even when not performing a stage of cutting. Furthermore, the sharp edge 58 and the sacrificial face 60 may be orthogonal to the cutting axis.

Furthermore, the blade 57 and the sacrificial face 60 are arranged on either side of and at a distance from the plane of passage P1. The plane of passage P1 thus passes through a space lying between the blade 57 and said sacrificial face 60. For example, other than during a stage of cutting, the blade 57 and the sacrificial face 60 are arranged equidistantly on either side of the plane of passage P1.

A distance 105 lies between the blade 57 and the sacrificial face 60 along the cutting axis D1. This distance 105 may be greater than or equal to one centimeter, for example.

In another aspect, the cutter assembly 55 and the sacrificial face 60 are movable in translation along the cutting axis D1, and possibly in translation only, along two respective "cutting" directions 101 and 102 that are mutually opposite, and also along two respective "return" directions 103 and 104 that are also mutually opposite. For example, the cutter assembly 55 and the sacrificial face 60 move together in translation, or else they move in alternation, i.e. one after the other.

In order to cut the tape, the cutter assembly moves in a first cutting direction 101 towards the tape, and the sacrificial face moves towards the tape along a second cutting direction 102 that is opposite to the first cutting direction 101. The first and second cutting directions 101 and 102 may be coplanar, for example. The cutter assembly 55 and the sacrificial face 60 meet, for example in the plane of passage, in order to cut the tape in this plane of passage.

Optionally, the cutter module may include at least one abutment for stopping the movement in translation of the cutter assembly and/or of the sacrificial face when the plane of passage is reached.

Once cutting has been performed, the cutter assembly moves in a first return direction 103 and the sacrificial face moves in a second return direction 104 opposite to the first return direction 103. The first and second return directions 103 and 104 may be coplanar, for example. The cutter assembly 55 and the sacrificial face 60 move away from the plane of passage in two opposite directions.

Furthermore, the cutter module may have a nozzle for blowing a fluid onto the tape.

The fluid blown onto the tape, in particular during the starting stage and during the deposition stage may play an important role on the resin of the deposited tape, making it more or less sticky as a function of the temperature of the fluid.

Furthermore, the cutter module may include at least one system for guiding the movement of the cutter assembly and/or the movement of the sacrificial face.

In addition, the cutter module 50 may include a movement system 51 for moving the cutter assembly 55 and the sacrificial face 60 in translation in the cutting directions 101 and 102, and in the return directions 103 and 104. The cutter assembly 55 and said sacrificial face 60 form two respective elements 61 and 62 that are moved by the movement system. The term "element" thus covers equally well the cutter assembly 55 and the sacrificial face 60.

FIG. 1 shows a first embodiment. In this embodiment, the movement system comprises a rack device 65.

The rack device 65 has a pinion 66 meshing with a rack 67. One of said elements 61 is constrained to move in translation with the pinion 66 by a first mechanical connection 63, and the other element 62 is constrained to move in translation with the rack 67 by a second mechanical connection 64. For example, the first mechanical connection 63 comprises bearing means arranged around a shaft secured to the pinion, with the bearing means being secured to the element. The second mechanical connection 64 may comprise at least one rod connecting the rack 67 to the corresponding element.

In the example shown diagrammatically, the cutter assembly constitutes the element that is constrained to move in translation with the pinion 66, and the sacrificial face 60 represents the element that is constrained to move with the rack 67. The opposite configuration could be envisaged.

In addition, the movement system includes an actuator 68 acting directly or indirectly to cause either the pinion 66 or the rack 67 to move.

In the example shown, the actuator 68 is a linear actuator acting on the cutter assembly, which is itself constrained to move in translation with the pinion 66. The actuator is also fastened to a stationary element 200. Under such circumstances, when the actuator 68 lengthens, the cutter assembly 55 moves towards the plane of passage P1. At the same time, the pinion 66 rotates about its axis of rotation and causes the rack 67 to move. The sacrificial face 60 then moves towards the plane of passage P1.

Figure 2:
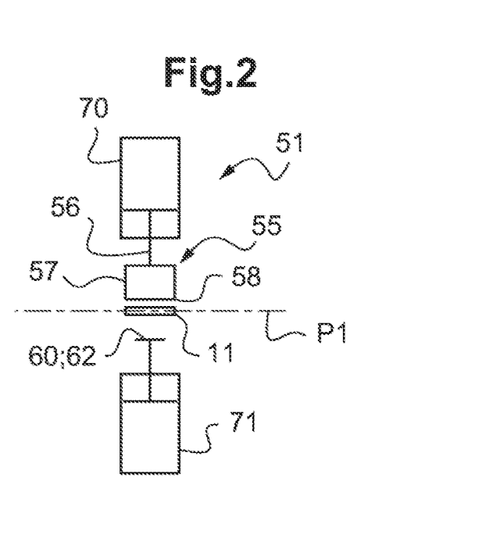

In the second embodiment shown in FIG. 2, the movement system has two actuators 70 and 71. A first actuator 70 is connected to the cutter assembly 55 in order to move only said cutter assembly 55 in translation along the cutting axis D1. A second actuator 71 is connected to the sacrificial face 60 in order to move only the sacrificial face 60 in translation along the cutting axis D1.

Figure 3:
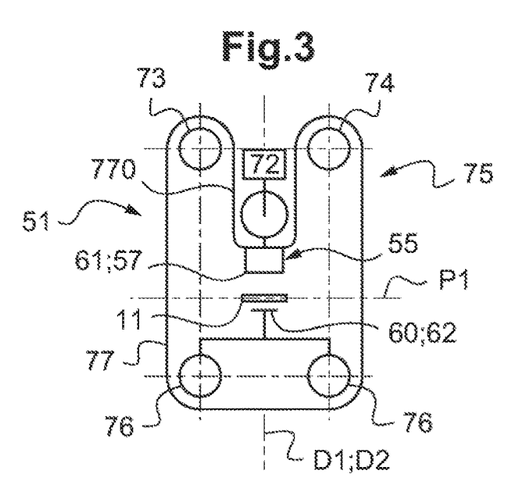

In a third embodiment shown in FIG. 3, the movement system comprises a system with a pulley 75 and a single actuator 72.

For clarification purposes, it is convenient to refer to one of said elements as the "active" element 61 and the other as the "passive" element 62. In the example shown, the active element 61 is the cutter assembly and the passive element 62 is the sacrificial face. The opposite configuration is possible.

Under such circumstances, the actuator 72 is connected to the active element 61 in order to move the active element in translation along the cutting axis D1. For example, the actuator 72 is connected to an intermediate pulley that is constrained to move in translation with the active element 61, and it moves the active element 61 via the intermediate pulley.

The pulley system 75 also has first and second return means 73 and 74 that are stationary in translation. The first and second return means 73 and 74 are arranged laterally on either side of a vertical plane P2. The vertical plane P2 is orthogonal to the plane of passage P1 and passes via the active element 61. By way of example, the first and second return means 73 and 74 are in the form of two respective return pulleys.

Furthermore, the pulley system 75 possesses at least one movable pulley 76, and for example two movable pulleys 76 in the variant shown. Each movable pulley is movable in translation along the cutting axis D1, both upwards and downwards in the illustration of FIG. 3. For example, each movable pulley has a shaft that slides in a rail.

Furthermore, each movable pulley is constrained to move in translation along the cutting axis D1 with the passive element 62. For example, a shaft of the movable pulley is secured to the sacrificial face 60, optionally via bearing means.

Under such circumstances, the pulley system 75 has a belt 77 describing a closed loop. The belt 77 passes in succession around the first return means 73 then around each of the movable pulleys 76, then around the second return means 74. Between the first and second return means, the belt has a segment 770 that is constrained to move in translation with the active element 61. For example, this segment passes through an intermediate pulley constrained to move in translation with the active element 61.

Consequently, the passive element 62 is arranged between the belt 77 and the plane of passage P1.

Under such circumstances, when the actuator 72 moves the active element 61 towards the plane of passage, the active element pulls on the belt, which then moves. The belt then exerts a force on each movable pulley so as to move the passive element towards the plane of passage P1. In the example of FIG. 3, the movable pulleys 76 cause the passive element to move upwards in translation as far as the plane of passage P1. Simultaneously, the pulley secured to the active element 61 continues its stroke driving the active element 61 downwards to the same plane of passage P1.

Conversely, when the actuator 72 moves the active element 61 away from the plane of passage, the movement of the belt 77 moves the passive element 62 away from the plane of passage, by gravity or indeed under the effect of a spring member, for example.

Figure 4:
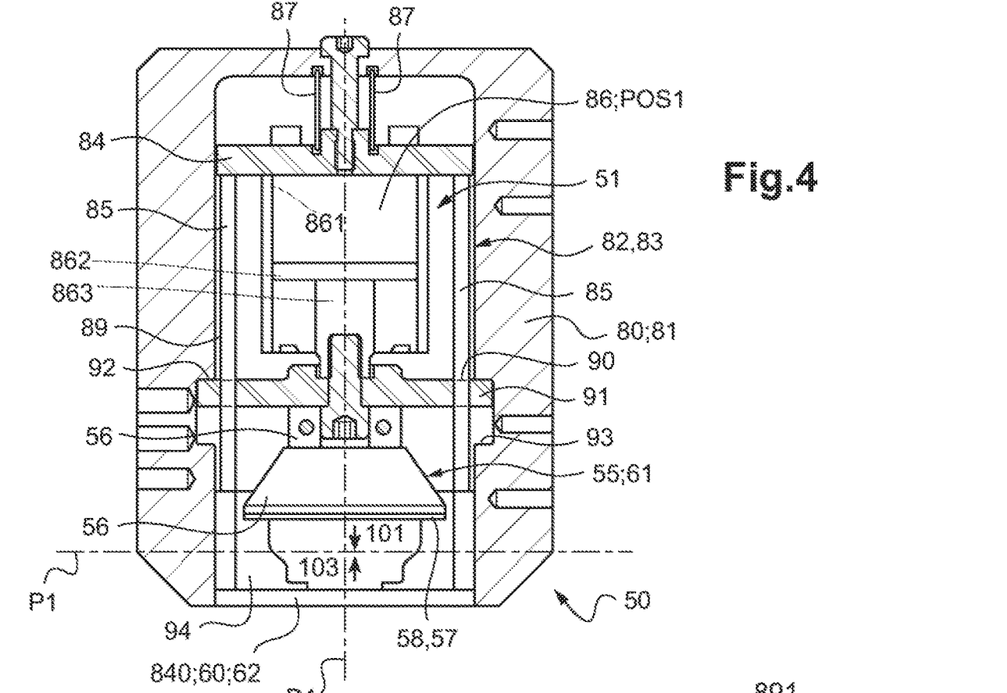
Figure 5:
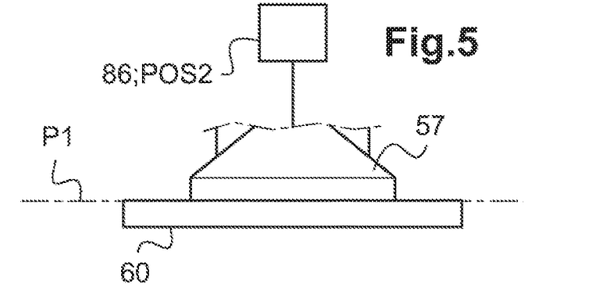
Figure 6:
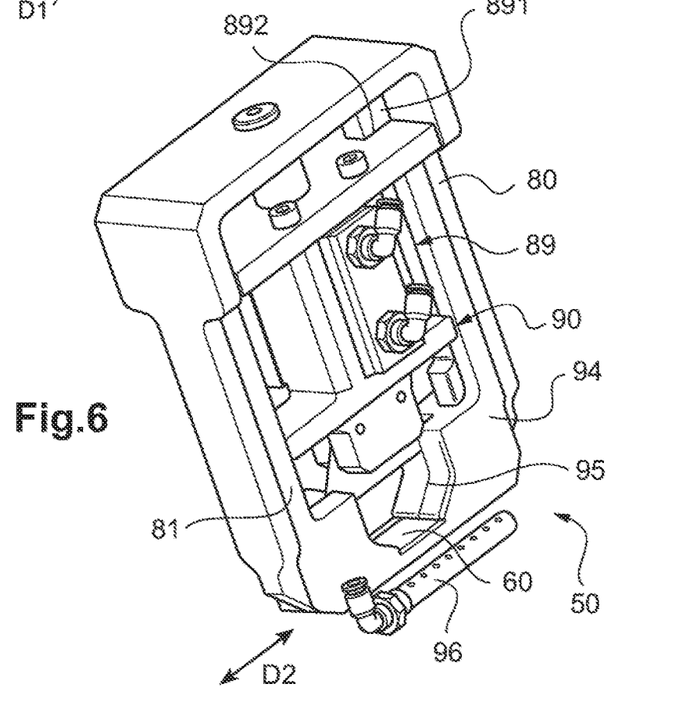

FIGS. 4 to 6 show a fourth embodiment.

The cutter module 50 comprises a stationary support 80. The stationary support 80 has a stationary frame 81, e.g. presenting an upside-down U-shape in section.

Furthermore, the cutter module 50 has a movable support 82 within the stationary support 80. The movable support 82 comprises a movable frame 83 within the stationary frame 81. The movable frame 83 extends along the cutting axis D1 from a bottom 840 to a top plate 84. For example sides 85 connect the bottom 840 and the top plate 84 together along the cutting axis D1.

The movable support 82 is movable in translation along the cutting axis D1 relative to the stationary support 80. Guide means 89 serve to guide movement in translation of the movable support 82 relative to the stationary support 80. FIG. 6 shows guide means 89 comprising a rail 891 of the stationary support 80 arranged in a slot 892 in the movable support 82.

Furthermore, at least one spring 87 may extend from the top plate 84 to the stationary support 80. The term "spring" is used to cover not only a spring as such, but also any other resilient member, e.g. a block of elastomer or a pneumatic, hydraulic, . . . member. The spring 87 tends to move the movable support away from the stationary support along the cutting axis D1.

Furthermore, the bottom has one of said elements referred to as the "bottom" element 62, while the other element is referred to as the "top" element 61. By way of example, the sacrificial face 60 represents the bottom element associated with the bottom, and the top element comprises the cutter assembly. The opposite configuration is possible.

The top element 61 is also movable in translation along the cutting axis D1 relative to the movable support 82, being arranged between the bottom and the top plate 84.

A guide system 90 serves to guide movement in translation of the top element 61 relative to the movable support 82. For example, the top element 61 has a finger 91 of the guide system, the guide system also including an oblong hole formed in the movable support 82, or in the stationary support. The finger 91 then slides in the oblong hole.

The guide system may serve to prevent the top element 61 from turning relative to the movable support. Likewise, the guide means may serve to prevent the movable support from turning relative to the stationary support.

The movement system has a single actuator 86 of variable length. The example of FIG. 4 shows a pneumatic or hydraulic actuator, however any other type of variable length actuator could be envisaged. The actuator 86 is fastened to the movable support 82, and by way of example to the top plate 84. Furthermore, the actuator 86 is fastened to the top element 61.

By way of example, the actuator 86 has a cylinder 861. A piston 862 subdivides the volume of the cylinder into a retraction chamber and an extension chamber, the piston 862 being secured to a piston rod 863 that exits the cylinder 861. By way of example, the cylinder 861 is fastened to the movable support 82 and the piston rod 863 is fastened to the top element 61, or vice versa. Optionally, the cutting force may be limited by a pressure that is controlled in said chambers as a function of the tape that is to be cut.

When the actuator is in the retracted position POS1 of FIG. 4, the blade is spaced apart from the sacrificial face 60. Conversely, when the actuator is in an extended position POS2, shown diagrammatically in FIG. 5, the blade is touching the sacrificial face 60 in the plane of passage.

In another aspect, the stationary support 80 may include a top abutment 92 and/or a bottom abutment 93. For example, a finger of the top element 61 may slide in a hole defined along the cutting axis by the top abutment 92 and/or the bottom abutment 93.

In another aspect, a guide 94 secured to the sacrificial face 60 may position the tape 11 for cutting transversely while it is being cut.

With reference to FIG. 6, such a guide may have inclined faces that lead to the sacrificial face 60.

In addition, the guide 94 may have at least one slot 95 in which the blade 57 slides.

Furthermore, a nozzle 96 may be used to blow a fluid onto the blade 57.

Under such circumstances, and with reference to FIG. 4, when the actuator 86 is caused to lengthen, the blade 57 is pushed in the first cutting direction 101 towards the tape by the rod of the actuator, possibly until it comes into contact with the top face of the tape as a result of the bottom abutment 93. Furthermore, the movable support is pushed along the second cutting direction 102 towards the stationary support, while compressing the springs 87. The sacrificial face 60 is thus pushed against the bottom face of the tape which is in contact with the blade 57. The tape is thus cut in its plane of passage P1.

After a few tenths of a second, the actuator 86 is caused to retract. Under the combined effect of the retraction of the actuator and of the springs, the blade and the sacrificial face move away from the tape quite quickly. The nozzle also blows a fluid onto the tape.

Figure 7:
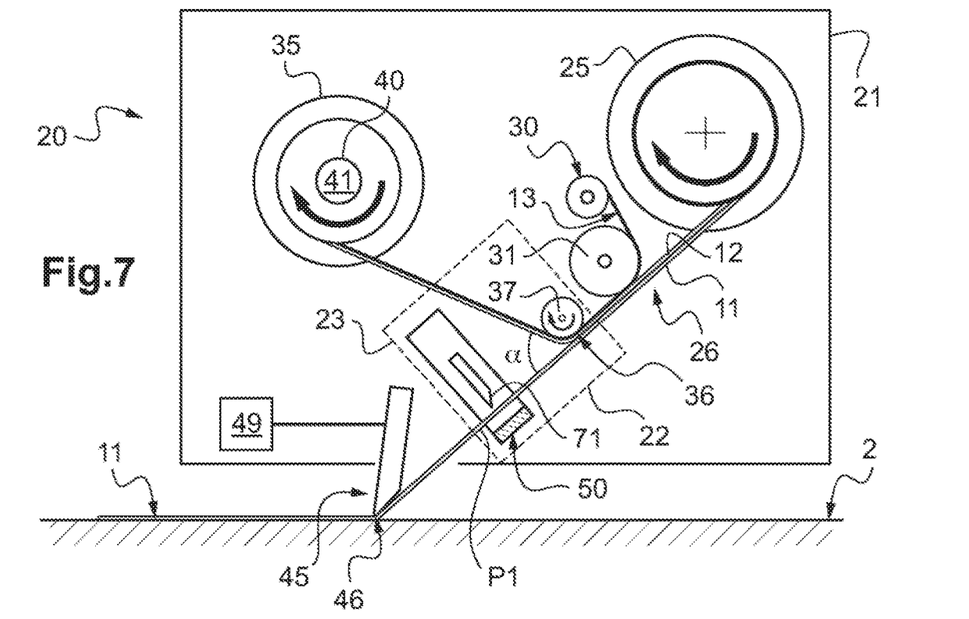
FIG. 7 is a view of a placement head provided with such a cutter module.

FIG. 7 is a diagram showing an embodiment of the placement head 20.

The placement head has a feed reel 25. An assembly 26 comprising an impregnated fiber tape 11 superposed on a separator tape 12 is wound around a feed core of the feed reel.

At the outlet from the feed reel, said assembly 26 is directed towards separator means 36 that serve to peel the assembly 26 apart. The separator means 36 comprise a separator roller 37 guiding the separator tape 12 towards a recovery reel 35.

In the variant shown, a protective tape 13 wound around a reel 30 is also interposed between the separator tape 12 and the separator means 36. The protective tape 13 is then interposed between the separator tape 12 and the separator means 36 in order to avoid clogging the separator means 36.

By way of example, an assembly roller 31 is used to place the protective tape 13 against the assembly 26, the assembly roller being placed between the feed reel 25 and the separator means 36.

The protective tape 13 and also the separator tape 12 and the impregnated fiber tape 11 are directed together towards the separator means 36, the protective tape 13 and the separator tape 12 then being guided towards the recovery reel 35.

Whatever the variant, the impregnated fiber tape 11 is not deflected and it continues its path towards the surface 2 on which the impregnated fiber 11 is to be deposited.

In addition, the placement head 20 may include drive means 40 for causing each tape to move. For example, a drive motor 41 serves to rotate the recovery reel 35.

The separator tape 12 and the protective tape 13 are thus driven by the drive means 40, if any. The impregnated fiber tape 11 adheres to the separator tape 12 upstream from the separator means 36. The impregnated fiber tape 11 is then caused to move by the separator tape 12, which then acts as a traction tape.

The impregnated fiber tape 11 passes through a cutter module 50 of the invention in its plane of passage P1, and is then directed towards a smoother 45. An actuator 49 can move the smoother vertically.

In another aspect, the applicator head may include an air conditioned chamber 22 fed by cooling means 23 in order to keep the impregnated fiber tape 11 at a predetermined temperature. The air conditioned chamber may for example be arranged around the separator means 36 and the cutter means 50.

Conversely, the smoother may include heater means, such as a heater plug arranged in the thickness of its body.

Nevertheless, the cutter means may be arranged on other types of placement head. For example, the cutter means may be arranged on the placement head described in the patent application filed on May 24, 2016 under the No. 16/00833 at the French patent office (Institut National de la Propriété Intellectuelle).

Figure 8:
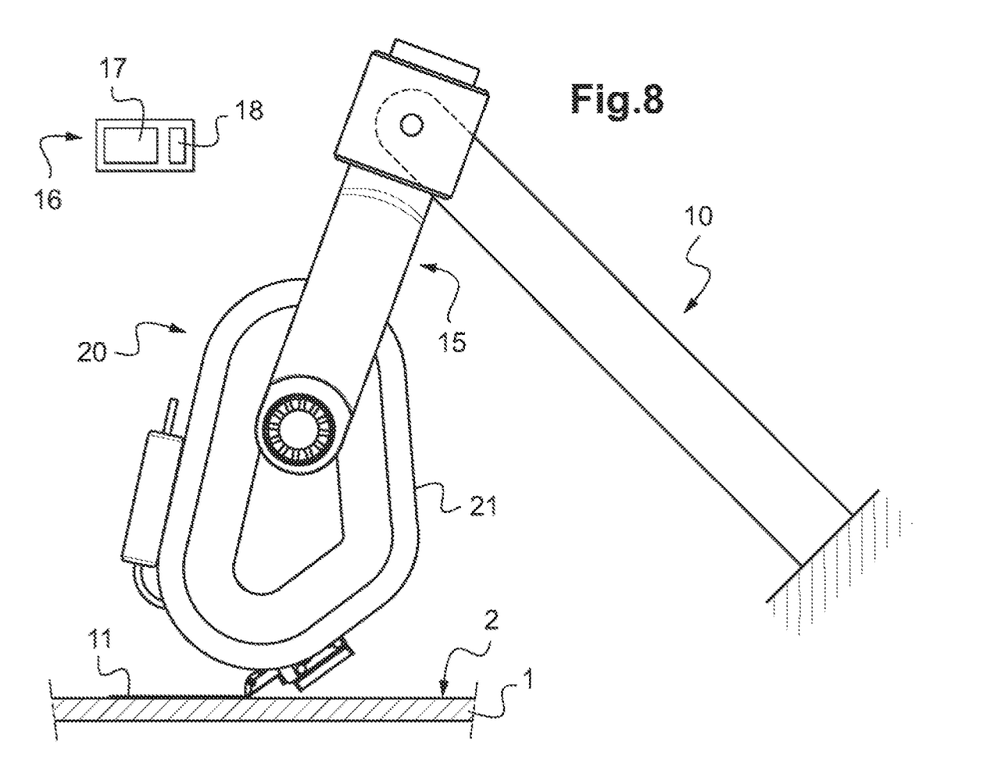
FIG. 8 is a view of such a placement head arranged within a placement system.

FIG. 8 shows a placement system 10 for placing a fiber tape on a deposition surface 2, such as a surface of a mold 1.

More particularly, the placement system 10 serves to place the impregnated fiber tape 11 on the deposition surface 2. The impregnated fiber tape 11 may have fibers that are impregnated with a resin using a wet technique, for example, in order to present large capacity for adhering to a support. The impregnated fiber tape 11 is then a tacky tape presenting a high degree of tack. Nevertheless, the impregnated fiber tape 11 could include fibers that are impregnated with a resin by a solvent technique.

The placement system 10 includes a placement head 20 and a placement device 15 for placing the placement head 20 in three dimensions. The placement head 20 comprises a structure 21 carried by the placement device 15. The placement device 15 may be a robot having articulated arms, or it may be a gantry suitable for moving the placement head in a plurality of directions.

Furthermore, the placement system 10 includes control means 16 for controlling the placement head 20 and the placement device 15.

The control means may be provided with a visual interface and with man/machine interfaces 18 operable manually by an operator in order to adjust the control parameters of the device 10. By way of example, these parameters may relate in particular to the movement of the placement head 20, to optional cutting of the impregnated fiber tape 11, to the temperature that exists in the placement head, and to any other parameter that is of use for operating the device 10.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A cutter module suitable for cutting a matrix-impregnated fiber tape, the cutter module comprising a cutter assembly provided with a blade, the cutter assembly being movable in translation along a cutting axis, the cutter module further comprising a sacrificial face, wherein the blade and the sacrificial face face each other in the cutting axis, the blade and the sacrificial face being arranged on either side of a plane of passage, and at a distance therefrom, the plane of passage being for containing the tape during an operation of depositing the tape, the cutter assembly and the sacrificial face being movable in translation together or in alternation along the cutting axis respectively in two opposite "cutting" directions, in order to cut the matrix impregnated fiber tape in the plane of passage during a stage of cutting, the cutter assembly and the sacrificial face being movable together or in alternation in translation along the cutting axis respectively in two opposite "return" directions in order to move away from the plane of passage after the cutting.

2. The cutter module according to claim 1, wherein the cutter module includes a movement system for moving the cutter assembly and the sacrificial face along the cutting directions and along the return directions.

3. The cutter module according to claim 2, wherein the cutter assembly and the sacrificial face form respectively two elements that are moved by the movement system, the cutter module comprising a stationary support and a movable support that is movable in translation along the cutting axis relative to the stationary support, the movable support comprising a movable frame extending along the cutting axis from a bottom to a top plate, the bottom comprising one of the two elements, referred to as a bottom element, and the other of the two elements being a top element, the top element being movable in translation along the cutting axis relative to the movable support and being arranged between the bottom and the top plate, the movement system having a single actuator that presents length that varies between an extended position and a retracted position, the actuator being fastened to the top plate and to the top element so that extension of the actuator from the retracted position towards the extended position causes the blade and the sacrificial face to move in the cutting directions and so that retraction of the actuator from the extended position towards the retracted position causes the blade and the sacrificial face to move along the return directions.

4. The cutter module according to claim 3, wherein the cutter module includes a movable support guide for guiding movement in translation of the movable support relative to the stationary support.

5. The cutter module according to claim 3, wherein the cutter module includes a top element guide for guiding movement in translation of the top element relative to the movable support.

6. The cutter module according to claim 3, wherein the stationary support includes a top abutment, the top element being in abutment against the top abutment when the actuator is in the retracted position.

7. The cutter module according to claim 3, wherein the stationary support includes a bottom abutment, the top element being in abutment against the bottom abutment when the actuator is in the extended position.

8. The cutter module according to claim 3, wherein the cutter module includes at least one spring arranged between the top plate and the stationary support.

9. The cutter module according to claim 2, wherein the cutter assembly and the sacrificial face respectively form two elements that are moved by the movement system, the movement system includes a rack device, the rack device comprising a pinion meshing with a rack, the rack device having an actuator for causing the pinion and the rack to move, one of the two elements being constrained to move in translation with the pinion, and the other one of the two elements being constrained to move in translation with the rack.

10. The cutter module according to claim 2, wherein the movement system comprises two actuators, one of the two actuators moving only the cutter assembly in translation along the cutting axis, the other one of the two actuators moving only the sacrificial face in translation along the cutting axis.

11. The cutter module according to claim 2, wherein the cutter assembly and the sacrificial face respectively form two elements that are moved by a movement system, the movement system comprising a pulley system and an actuator, one of the two elements, being an active element movable in translation along the cutting axis under the action of the actuator, and the other one of the two elements being a passive element, the pulley system having first and second return means that are stationary in translation and that are arranged laterally on either side of a plane that is orthogonal to the plane of passage and that passes via the active element, the pulley system having at least one movable pulley that is movable in translation along the cutting axis and that is constrained to move with the passive element in translation along the cutting axis, the pulley system comprising a belt, the belt passing in succession around the first return means then around each the at least one pulley, then around the second return means in order to return to a portion that is constrained to move in translation with the active element, the passive element being arranged between the belt and the plane of passage so that a movement in translation of the active element gives rise to a movement of the belt, thereby causing the passive element to move in translation.

12. The cutter module according to claim 1, wherein the cutter module includes a guide secured to the sacrificial face in order to position the tape transversely during cutting along a transverse axis orthogonal to the cutting axis.

13. The cutter module according to claim 12, wherein the guide includes at least one slot, the blade sliding in the slot.

14. The cutter module according to claim 1, wherein, other than in the stage of cutting, a distance separates the blade and the sacrificial face along the cutting axis, the plane of passage passing through a space between the blade and the sacrificial face, the distance being greater than or equal to one centimeter.

15. The cutter module according to claim 1, wherein the cutter module includes a nozzle blowing a fluid at controlled temperature under the tape.

16. The cutter module according to claim 1, wherein the blade has a cutting edge arranged directly above the sacrificial face.

17. A placement head for placing a matrix-impregnated fiber tape on a support, wherein the placement head includes a cutter module according to claim 1.

18. A placement system having a placement head, a placement device, and a controller for controlling the placement device and the placement head, wherein the placement head is according to claim 17.

19. A cutter module for cutting a matrix-impregnated fiber tape, the cutter module comprising a cutter assembly having a blade, the blade being movable in translation along a cutting axis, the cutter module further comprising a sacrificial face below the blade, wherein the blade and the sacrificial face opposingly face each other in the cutting axis, the blade and the sacrificial face disposed on opposite sides of a plane of passage at a distance from the plane of passage, the plane of passage being for containing the tape during an operation of depositing the tape, the cutter assembly and the sacrificial face movable in translation along the cutting axis respectively in two opposite cutting directions, in order to cut the matrix impregnated fiber tape in the plane of passage during a stage of cutting, the cutter assembly and the sacrificial face movable in translation along the cutting axis respectively in two opposite return directions in order to move away from the plane of passage after the cutting.

20. A method of cutting a matrix-impregnated fiber tape after an operation of depositing the tape on a support, wherein the method comprises the steps of:
  providing a cutter module suitable for cutting the matrix-impregnated fiber tape, the cutter module comprising a cutter assembly provided with a blade, the cutter assembly being movable in translation along a cutting axis, the cutter module further comprising a sacrificial face, wherein the blade and the sacrificial face face each other in the cutting axis, the blade and the sacrificial face being arranged on either side of a plane of passage, and at a distance therefrom;
  moving the blade and the sacrificial face together or in alternation along two opposite cutting directions in order to reach a plane of passage, the tape being arranged in the plane of passage during the deposition operation;
  cutting the tape in the plane of passage by means of the blade and the sacrificial face; and moving the blade and the sacrificial face together or in alternation along two opposite return directions to go away from the plane of passage.

* * * * *